United States Patent [19]

Knecht

[11] 4,366,779
[45] Jan. 4, 1983

[54] WIND DRIVEN HEATING SYSTEM

[76] Inventor: John E. Knecht, 360 N. Michigan Ave., Chicago, Ill. 60601

[21] Appl. No.: 869,424

[22] Filed: Jan. 16, 1978

[51] Int. Cl.³ .......................... F22B 3/06; F04B 17/02
[52] U.S. Cl. ..................................... 122/26; 126/247; 417/334; 418/206
[58] Field of Search ......................... 417/334; 126/247; 122/26; 418/206

[56] References Cited

U.S. PATENT DOCUMENTS

| | | | |
|---|---|---|---|
| 1,517,461 | 12/1924 | Robinson | 417/334 |
| 2,855,854 | 10/1958 | Aspelin | 418/206 X |
| 2,936,717 | 5/1960 | Käle | 418/206 X |
| 3,162,140 | 12/1964 | Petit | 418/206 X |
| 3,479,957 | 11/1969 | Ladman | 418/206 X |
| 3,783,858 | 1/1974 | Ashikian | 126/247 |
| 3,908,753 | 9/1975 | Balch | 417/334 X |
| 3,952,723 | 4/1976 | Browning | 122/26 X |
| 3,989,189 | 11/1976 | Kits | 126/247 X |
| 3,995,975 | 12/1976 | Bosch | 418/206 X |
| 4,060,194 | 11/1977 | Lutz | 126/247 |

FOREIGN PATENT DOCUMENTS

581786 10/1924 France .............................. 417/203
157903 6/1921 United Kingdom ................. 122/26

Primary Examiner—Richard E. Gluck
Attorney, Agent, or Firm—Hume, Clement, Brinks, Willian & Olds, Ltd.

[57] ABSTRACT

An apparatus for converting wind energy to heat is disclosed which includes a wind powered turbine and a positive displacement gear pump which is powered by the turbine and serves to pump a fluid through a flow restricting orifice. This fluid exits from the orifice at a high rate of flow, and the kinetic energy of the fluid flow is converted into heat by a diffuser which is adapted to slow the flow rate of the fluid. In this apparatus the energy consumed by the constant displacement pump is substantially the same function of turbine shaft speed as is the available wind energy, and, therefore, the apparatus of this invention functions efficiently at a wide range of wind speeds. Furthermore, since the wind energy is converted to heat, a relatively low cost constant displacement pump may be used. Internal pump leakage, which is generally regarded as a drawback of low cost pumps, only serves to further heat the fluid being pumped, and in this application does not degrade the efficiency of the apparatus.

8 Claims, 5 Drawing Figures

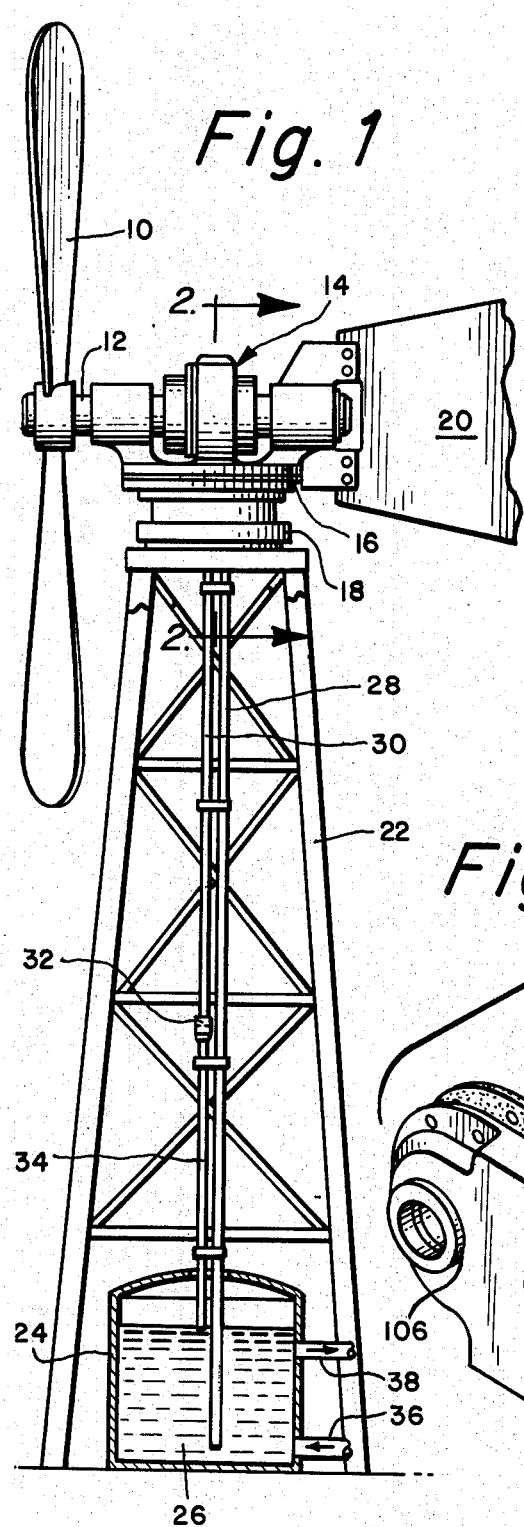
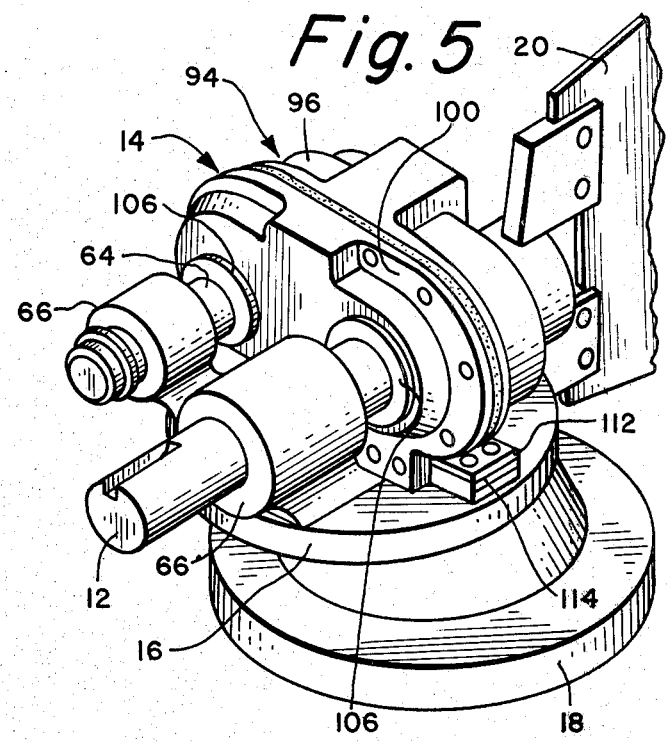
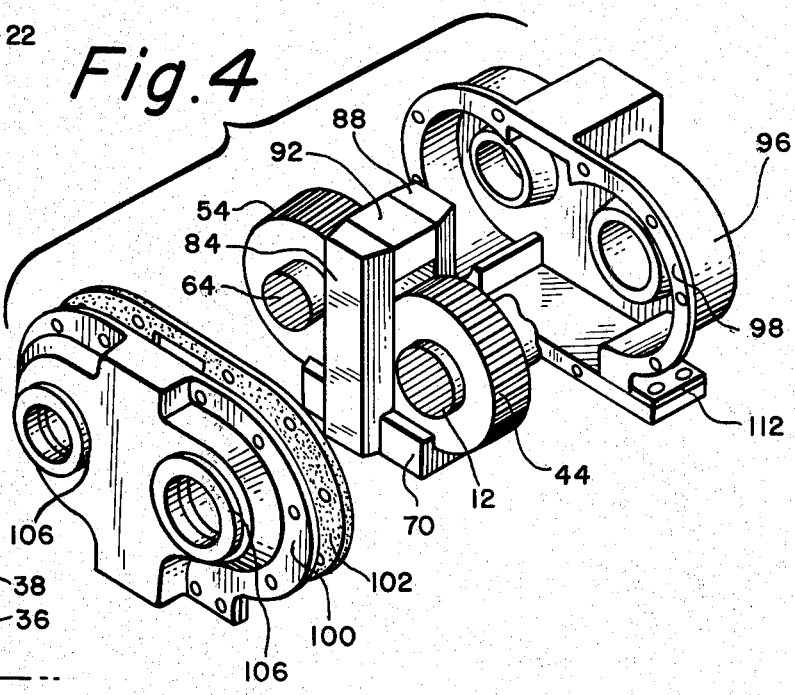

WIND DRIVEN HEATING SYSTEM

BACKGROUND OF THE INVENTION

The apparatus of this invention is a wind driven heating system which efficiently converts the kinetic energy of wind into heat for a wide range of wind velocities.

It has long been recognized that wind energy is a potentially important source of usable energy, and attempts have been made to provide wind driven heating systems suitable for heating homes, buildings, greenhouses, and other structures. One example of such an attempt is the system described by Ashikian in U.S. Pat. No. 3,752,395. Ashikian's heating system includes a wind powered turbine which is used to power a centrifugal pump which forces a fluid through a small diameter pipe. Ashikian states that the shear stresses created by this fluid flow cause a portion of the kinetic energy of the flowing fluid to be dissipated as heat which is stored for use.

While systems such as that described by Ashikian do serve to convert a part of the available wind energy into heat, they suffer from certain disadvantages. First, these systems do not efficiently extract energy from the wind for a wide range of wind speeds. In order for an energy conversion system such as a wind driven heating system to operate efficiently, the energy converter should consume a large percentage of the available energy supplied by the turbine for a wide range of turbine speeds. That is, for any given turbine speed, the energy converter should convert a large percentage of the available mechanical energy of rotation of the turbine into heat. In practical terms, this means that it is desirable to have the energy converter consume energy at the same ratio to the turbine speed as the available wind energy. The Ashikian system extracts energy from the wind turbine with a centrifugal pump which forces a fluid through a small diameter pipe. Such a system does not consume energy at the same ratio to the turbine speed as the available wind energy, and, therefore, the Ashikian system cannot function efficiently for a wide range of wind velocities.

Second, Ashikian teaches the use of a long, small diameter pipe to convert the kinetic energy of fluid pumped by the centrifugal pump into heat. In some applications, the cost and bulk of this pipe may limit the applications in which the heating system may advantageously be used.

It is the primary object of the present invention to overcome these and other disadvantages of wind driven heating systems in the prior art.

SUMMARY OF THE INVENTION

The wind driven heating system of this invention includes a wind turbine, a positive displacement pump, a discharge orifice, and diffuser or other means for slowing the velocity of a fluid. In this context, a "positive displacement pump" is a pump which displaces a substantially constant volume of fluid for a specified travel of the drive shaft. The wind turbine is coupled to drive the pump, and rotation of the wind turbine extracts energy from wind pressure which is used to operate the pump. The pump is adapted to deliver pressurized fluid to the flow restricting discharge orifice. The pressurized fluid passes through the orifice at a high velocity, and this high speed fluid flow is slowed by the diffuser means, thereby converting the kinetic energy of the high speed fluid flow into heat. Thus, the heating system of this invention converts wind energy into the kinetic energy of a flowing fluid and then converts this kinetic energy into thermal energy or heat.

It has been discovered that a positive displacement pump operating to pass a pressurized fluid through an orifice is well adapted to efficiently extract wind energy from a wind turbine. When the pressurized fluid must pass through an orifice of constant effective area such that the velocity of the fluid passing through the orifice is proportional to the rotational velocity of the drive shaft of the pump, the energy consumed by such a pump is substantially proportional to the energy available from a wind turbine for a wide range of wind and turbine speeds.

It has further been discovered that a low cost gear pump is a suitable positive displacement pump for use with the heating system of this invention. Though such pumps are often characterized by internal leakage, a problem which has heretofore discouraged their use in many applications, it has been found that such leakage can be used advantageously in the heating system of the invention. In particular, this internal leakage can be used to heat the pumped fluid, thereby maximizing the useful heat that can be provided from the available wind energy. Accordingly, the pump used in the heating system of the invention may be built without high pressure seals or close tolerances which are ordinarily required to avoid leakage, yet the system is capable of delivering a maximum amount of heat.

BRIEF DESCRIPTION OF THE DRAWINGS

The wind driven heating system of this invention, together with further objects and attendant advantages, will best be understood by reference to the following detailed description of a preferred embodiment of the invention taken in connection with the accompanying drawings, in which:

FIG. 1 is a side view in partial cutaway of the preferred embodiment of the invention;

FIG. 4 is an exploded perspective view of the gear pump shown in FIG. 2; and

FIG. 5 is a perspective view of the gear pump and support structure shown in FIG. 1.

DETAILED DESCRIPTION OF THE PREFERRED EMBODIMENT

Figure 2:
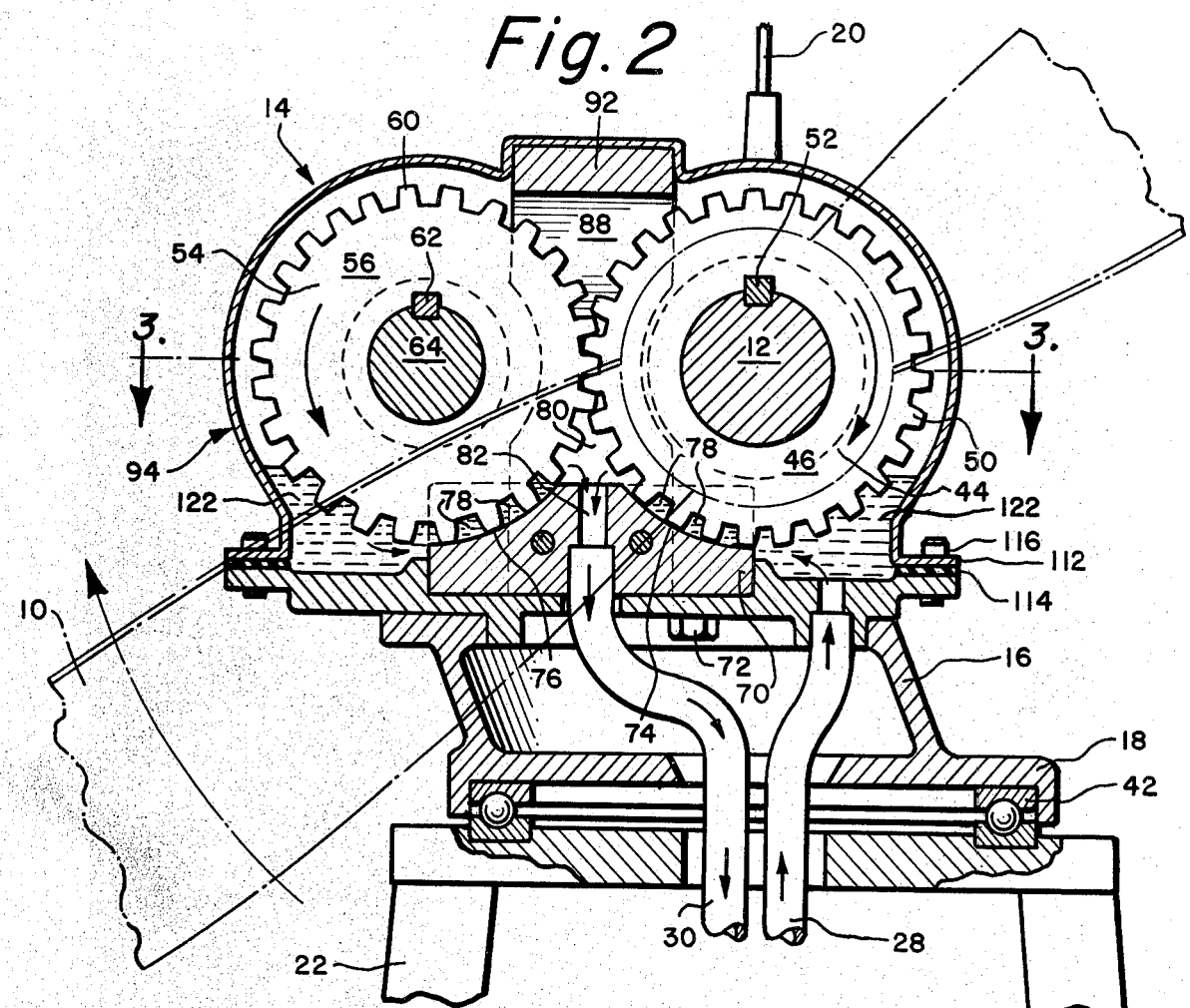
FIG. 2 is a sectional view of the positive displacement gear pump of this embodiment taken along line 2—2 in FIG. 1.

As noted, above, it has been discovered that an inexpensive positive displacement pump coupled to an orifice of substantially constant effective area can be used to maximize the useful heat that can be provided from the available wind energy. The combination of such a pump and orifice is well suited for use in a wind powered system, because the energy consumed by this combination is substantially proportional to the energy available to the wind turbine for a wide range of wind speeds. This can be seen by noting that the kinetic energy of fluid forced through the orifice by the pump is proportional to the mass of fluid pumped per unit time multiplied by the square of the fluid discharge velocity. In this combination both the fluid velocity and the mass of fluid pumped per unit time are substantially proportional to the pump speed, and both the kinetic energy of the discharge fluid and the energy consumed by the pump are, therefore, substantially proportional to the third power of the pump speed. It is well known that wind energy which is available to the turbine is approximately proportional to the third power of the wind speed, and that for many turbines, the turbine speed is substantially directly proportional to the wind speed. Therefore, both the energy consumed by the combination of a positive displacement pump and an orifice of substantially constant effective area and the energy available to a turbine are substantially proportional to the third power of the turbine shaft speed. Accordingly, the wind driven heating system of this invention will operate efficiently over a wide range of wind speeds.

Referring now to the drawings, FIG. 1 depicts an exemplary embodiment of the wind driven heating system of this invention. This embodiment includes a wind turbine 10, a pump 14, and fluid flow restriction means such as an orifice 32.

The wind turbine 10 is adapted to convert kinetic wind energy into rotational energy. The wind turbine 10 shown in FIG. 1 is a horizontal axis turbine built of of two turbine blades, but vertical axis turbines or horizontal axis turbines having three or more blades may be advantageously used in some applications. The turbine 10 may be of conventional design, but for many applications it is preferably of lightweight and inexpensive construction.

Figure 3:
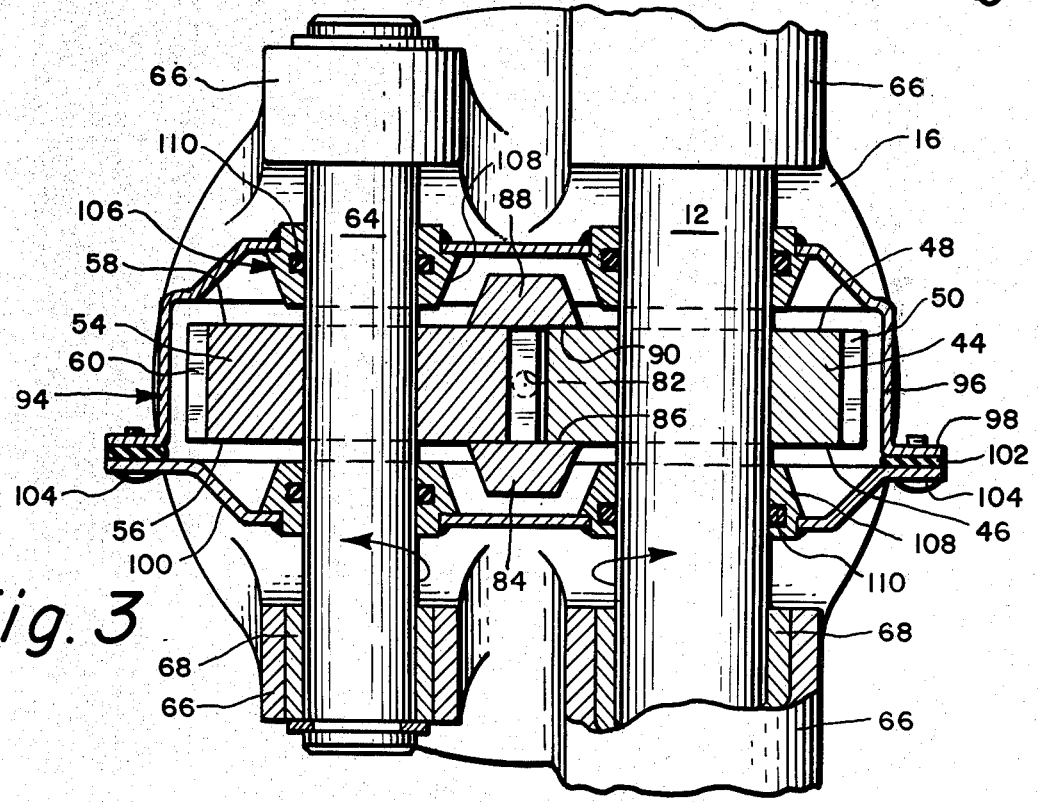
FIG. 3 is a sectional view taken along line 3—3 of FIG. 2.

The turbine 10 is supported by a drive shaft 12 which rotationally couples the turbine 10 with the pump 14. The pump 14 is a positive displacement pump which, in this embodiment, is preferably a gear pump. A suitable gear pump which is relatively inexpensive to construct is depicted in FIGS. 2-4. As previously discussed, the power needed to drive a positive displacement pump which operates to force fluid through a constant effective area orifice is substantially proportional to the cube of the drive shaft speed, and the power which a wind turbine can supply is also substantially proportional to the cube of the drive shaft speed. Therefore, the combination of a positive displacement pump and an orifice is well suited for extracting energy from a wind turbine and converting this energy into the kinetic energy of pressurized fluid flow.

The drive shaft 12 and the pump 14 are supported by a support structure 16 which includes a turntable 18 which is rotatably mounted on the top of a tower 22. A wind vane 20 is secured to the support structure 16 which operates to rotate the support structure about the tower 22 so as to point the wind turbine 10 into the wind. In alternate embodiments of the invention, the turbine can be placed down-wind of the support structure where it will follow the wind direction without the need of a wind vane.

A fluid reservoir 24 is provided which is filled with a fluid 26. An intake pipe 28 is secured to the rotatable support structure 16 and serves to transport fluid from the reservoir 24 to the low pressure intake of the pump 14. An output pipe 30, which is also secured to the rotatable support structure 16, serves to transport pressurized fluid from the high pressure discharge outlet of the pump to a flow restricting orifice 32. Fluid which has passed through the orifice 32 is conducted back into the reservoir by a conduit 34. The reservoir 24 is also provided with a fluid supply pipe 38 and a fluid return pipe 36. In many applications, water may advantageously be used as the fluid 26 contained in the reservoir 24. However, the fluid used should not be subject to freezing under the anticipated operational conditions. In some applications it may be advantageous to provide a pump which operates to pump fluid up the intake pipe 28 from the reservoir 24 to the pump 14.

In operation, wind pressure rotates the wind turbine 10 and the drive shaft 12 which drives the pump 14. The pump 12 operates to pump the fluid 26 from the reservoir 24, up the intake pipe 28, through the pump 14, and down the output pipe 30 to the orifice 32. The orifice 32 restricts fluid flow through the output pipe 30, and consequently, the fluid 26 discharges through the orifice 32 at high speed. The size of the orifice 32 should be chosen so that the load on the turbine 10 is not sufficient to stall the turbine, but is sufficient to extract substantially all of the wind energy available to the turbine 10. Furthermore, the orifice 32 should present a constant effective area to the discharging fluid for a range of fluid discharge velocity. The high speed jet of fluid which has passed through the orifice 32 is conducted back to the reservoir 24 by conduit 34. The conduit 34 and the fluid 26 in the reservoir 24 act as a diffuser to slow the velocity of the fluid which has passed through the orifice 32. In this manner, the kinetic energy of the jet of fluid is converted into heat energy, which warms the fluid in the reservoir 24. Warm fluid may be removed from the reservoir 24 through fluid supply pipe 36 and used to heat houses, greenhouses, or the like. This fluid is cooled in use and then returned to the reservoir through the fluid return pipe 36.

FIGS. 2, 3, and 4 depict a low cost pump which may be advantageously used with the heating system of FIG. 1. As best shown in FIG. 2, this pump is mounted on the support structure 16 which is rotatably mounted on the top of the tower 22. A bearing 42 is mounted between the support structure 16 and the tower 22 to reduce rotational friction. The tower intake pipe 28 and the tower output pipe 30 extend through the bearing 42 and rotate with the support structure 16 and the pump 14.

The pump 14 is a gear pump which includes a cylindrical driving gear 44 and a cylindrical driven gear 54. The driving gear 44 is provided with a front face 46, a rear face 48 and a circumferential array of gear teeth 50, and is mounted on the drive shaft 12 with a key 52. Similarly, the driven gear is provided with a front face 56, a rear face 58, a gear teeth 60, and is mounted on the driven gear shaft 64 with a key 62. The gear shafts 12 and 64 are held in position by bearings 66 which are secured to the support structure 16 and are provided with bearing material linings 68.

The pump 14 also includes a pressure cap 70 which is rigidly mounted on the support structure 16 with fasteners such as bolts 72. The pressure cap 70 is provided with two curved surfaces 74, 76, having the same shape as the outer diameter of the gears 44, 54, and is positioned between the two gears 44, 54 so that the clearance between the curved surfaces 74, 76 and the gear teeth 50, 60 is relatively small. The gaps between the gear teeth 50, 60 and the arcuate surfaces 74, 76 define isolated moving volumes 78. The pressure cap 70 defines a discharge port 82.

A front side plate 84 which defines an inner surface 86 is secured to the front of the pressure cap 70, and a rear side plate 88 defining an inner surface 90 is secured to the rear of the pressure cap 70. A spacer block 92 is secured to the upper ends of the side plates 84, 88 to maintain the separation between the side plates 84, 88 substantially constant. A high pressure discharge chamber 80 is defined by the side plates 84, 88, the pressure cap 70, and the gears 44, 54.

As shown in FIGS. 2, 3, and 4, the internal components of the pump 14 are surrounded by a casing 94 which includes a casing pan 96 defining a flange 98 and a casing plate 100 which are held together by a fastening means such as bolts 104. A gasket 102 is provided to reduce leakage. Low pressure seals 106 are provided to reduce leakage at the points where gear shafts 12, 64 pass through the casing 94. These seals 106 include seal hubs 108, which are secured to the casing pan 96 and the casing plate 100, and sealing rings 110 which contact the shafts 12, 64. The casing pan 96 also defines a base flange 112 which is secured to the support structure 16 with fastening means such as bolts 116. A base gasket 114 reduces leakage between the support structure 16 and the flange 112. The casing 94 completely surrounds the gears 44, 54 and defines a low pressure intake chamber 122 between the casing 94 and the gears 49, 54. The intake pipe 28 is connected to the intake chamber 122, and the output pipe 30 extends from the high pressure discharge port 82 to the orifice 32.

The operation of the gear pump 14 may now be described. In general terms, the pump 14 functions to draw fluid up the intake pipe 28 into the intake chamber 122. The rotating gear 44, 54 then transport the fluid from the intake chamber 122 into the high pressure chamber 80. The fluid then moves out of the high pressure chamber 80, through the output pipe 30 to the orifice 32.

The pressure cap 70 and the gears 44, 54 cooperate to generate the pumping action. Fluid is transported into the high pressure chamber 80 in the isolated moving volumes 78 which are defined by the pressure cap 70, the gear teeth 50, 60 and the side plates 84, 88. As the gears 44, 54, rotate, these moving volumes 78 move from the intake chamber 122 into the high pressure chamber 80. However, the gear teeth 50, 60 do not transport the same volume of fluid out of the high pressure chamber as the gear 44, 54 continue to rotate, for the gear teeth 50, 60 intermesh and accordingly, the volume carried out between the gear teeth 50, 60 is less than the volume carried into the high pressure chamber 80.

This pumping action generates a high pressure in the high pressure chamber 80. The clearances between the component parts of the high pressure chamber 80 are sized so that intercomponent clearances are small. For example, the curved surfaces 74, 76 are located in close proximity to the tops of the gear teeth 50, 60, and the inner faces 86, 90 of the front and rear side plates 84, 88 are located in close proximity to the front 48 and 58 and rear 46 56 gear faces, respectively. By keeping these clearances small, leakage from the high pressure chamber 80 to the low pressure intake chamber 122 is reduced.

Since one of the objects of the heating system of this invention is to convert wind energy into heat, internal leakage within the pump 14 does not result in system inefficiency. Such leakage merely results in a heating of the pump and the fluid in the intake chamber 122. If the pump is insulated to retain this heat, then internal pump leakage is merely an alternate means by which the wind energy is used to heat the fluid. Consequently, the pump 14 is preferably built without high pressure seals or extremely close tolerances between the pumping components. The clearances need be no smaller than can be conveniently fabricated, and, as tolerances in the range of one-half to two thousandths of an inch may be advantageously used in many applications, the pump is accordingly relatively inexpensive to fabricate.

One of the advantages of this pump is that only the high pressure discharge chamber 80 is subjected to high fluid pressure. Since the intake chamber 122 is maintained at low pressure, low pressure seals 106 may be used around the shafts 12, 64, and the casing 94 may be inexpensively fabricated from sheet metal. In the preferred embodiment the casing 94 is built to withstand relatively low pressres less than about 100 pounds per square inch; however, the pump 14 of this invention functions normally even when the casing 94 is removed, and it may be used without the casing 94 by submerging the pump 14 in a fluid filled container.

Of course, it should be understood that various changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An apparatus for efficiently converting wind energy into heat for a range of wind velocities, said apparatus comprising:

a wind turbine;

a positive displacement pump driven by the turbine to pressurize a fluid;

means for providing a substantially constant effective discharge area through which substantially all of the pressurized fluid is allowed to pass, said discharge area sized to convert a major portion of the wind energy available to the turbine into kinetic energy of moving fluid such that a major portion of available wind energy is efficiently converted into kinetic energy of moving fluid for a range of wind velocities; and means for slowing the rate of flow of fluid after it has passed through the discharge area in order to efficiently convert kinetic energy of fluid flow into heat.

2. The apparatus of claim 1 wherein the positive displacement pump is a gear pump.

3. The apparatus of claim 2 wherein the pump includes a high pressure chamber, and the pump is characterized by an internal leakage area through which fluid leaks out of the high pressure chamber and further, wherein the discharge area means includes a discharge orifice and the combination of the discharge orifice and the leakage area forms said substantially constant effective discharge area.

4. The apparatus of claim 1 wherein the positive displacement pump comprises:

first and second toothed gears rotatably mounted in meshing engagement on first and second shafts, respectively, each of said gears defining front and back faces;

means for defining a high pressure chamber between the first and second gears near the region of gear engagement, said chamber defining means including first and second side elements mounted adjacent the front and back faces, respectively, of the first and second gears, and a pressure cap mounted adjacent both the first and second side elements and the first and second gears, said side elements sized to fit between the first and second shafts such that the first and second shafts are outside the high pressure chamber; and means for defining a low pressure region surrounding the first and second shafts adjacent the first and second gears, respectively.

5. The apparatus of claim 4, further comprising:

a casing surrounding the first and second gears and defining an opening through which the first shaft passes; and a low pressure seal mounted between the casing and the first shaft, which seal substantially prevents the leakage of fluid therebetween.

6. The apparatus of claim 1 wherein the pump includes a high pressure chamber, and the pump is characterized by an internal leakage area through which fluid leaks out of the high pressure chamber and further, wherein the discharge area means includes a discharge orifice and the combination of the discharge orifice and the leakage area forms said substantially constant effective discharge area.

7. The apparatus of claim 4 wherein the pump is characterized by a internal leakage area between the first and second gears and the first and second side elements and the pressure cap, through which leakage area fluid leaks out of the high pressure chamber, and further, wherein the discharge area means includes a discharge orifice, and the combination of the discharge orifice and the leakage area forms said substantially constant effective discharge area.

8. An apparatus for efficiently converting wind energy into heat for a wide range of wind velocities, said apparatus comprising:

a wind turbine;

a positive displacement gear pump driven by the turbine to pressurize a fluid, said pump including:

first and second toothed gears rotatably mounted in meshing engagement on first and second shafts, respectively, each of said gears defining front and back faces;

means for defining a high pressure chamber between the first and second gears near the region of gear engagement, said chamber defining means including first and second side elements mounted adjacent the front and back faces, respectively, of the first and second gears, and a pressure cap mounted adjacent both the first and second side elements and the first and second gears, said side elements sized to fit between the first and second shafts such that the first and second shafts are outside the high pressure chamber;

means for defining a low pressure region surrounding the first and second shafts adjacent the first and seconds gears, respectively, said pump defining a leakage area from the high pressure chamber to the low pressure region;

a discharge orifice;

means for conducting fluid pressurized by the pump to the orifice, said orifice sized such that the combination of the orifice and the leakage area forms a discharge area of substantially constant effective area which converts substantially all of the wind energy available to the wind turbine into kinetic energy of moving fluid for a wide range of wind velocities; and means for slowing the rate of flow of the fluid after it has passed through the orifice and the leakage are to efficiently convet kinetic energy of fluid flow into heat.

* * * * *

UNITED STATES PATENT AND TRADEMARK OFFICE
CERTIFICATE OF CORRECTION

PATENT NO. : 4,366,779

DATED : Jan. 4, 1983

INVENTOR(S) : John E. Knecht

It is certified that error appears in the above—identified patent and that said Letters Patent is hereby corrected as shown below:

In column 3 line 22 please delete "of" and insert therefor --up--. In column 6 line 11 please delete "Pressres" and insert therefor --pressures--. In claim 8 column 8 line 33 please delete "are" and insert therefor --area--. In claim 8 column 8 line 34 please delete "convet" and insert therefor --convert--.

Signed and Sealed this

Sixteenth Day of August 1983

[SEAL]

Attest:

Attesting Officer

GERALD J. MOSSINGHOFF

Commissioner of Patents and Trademarks